US006450277B1

(12) United States Patent
Kargilis et al.

(10) Patent No.: US 6,450,277 B1
(45) Date of Patent: Sep. 17, 2002

(54) ARRANGEMENT FOR TEMPORARILY DISPLAYING AN IMAGE ON A MOTOR VEHICLE PANEL

(75) Inventors: John S Kargilis, Northville; Daniel E Cullen, Lake Orion; Daniel J Pearlman, Sterling Heights, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/717,506

(22) Filed: Nov. 21, 2000

(51) Int. Cl.[7] .............................................. B62D 25/10

(52) U.S. Cl. ...................... 180/69.2; 180/89.1; 40/446; 427/145; 296/191

(58) Field of Search ............................ 180/69.2, 69.21, 180/69.22, 69.24, 89.1; 40/427, 446; 427/145; 296/191

(56) References Cited

U.S. PATENT DOCUMENTS

| | | | | | |
|---|---|---|---|---|---|
| 2,689,424 | A | | 9/1954 | Clagett | 41/22 |
| 3,310,130 | A | | 3/1967 | Freet | 161/18 |
| 3,654,062 | A | | 4/1972 | Loew | 161/119 |
| 4,186,476 | A | * | 2/1980 | Mair et al. | 180/69.21 |
| 4,493,748 | A | | 1/1985 | Cross | 156/79 |
| 4,560,604 | A | * | 12/1985 | Shimizu et al. | 428/87 |
| 4,584,232 | A | | 4/1986 | Frank et al. | 428/247 |
| 4,917,643 | A | | 4/1990 | Hippely et al. | 446/14 |
| 4,923,539 | A | | 5/1990 | Spengler et al. | 156/79 |
| 5,296,657 | A | | 3/1994 | Gilliland et al. | 181/294 |
| 5,316,513 | A | | 5/1994 | Nakagawa et al. | 446/14 |
| 5,451,181 | A | | 9/1995 | Denoux | 446/465 |
| 5,503,583 | A | | 4/1996 | Hippely et al. | 446/14 |
| 5,688,346 | A | | 11/1997 | Corbusier | 156/60 |

* cited by examiner

*Primary Examiner*—Michael Mar
(74) *Attorney, Agent, or Firm*—Mark P. Calcaterra

(57) ABSTRACT

A phantom image is temporarily displayed on a body panel of a motor vehicle. The image appears under certain weather conditions and then vanish after a few moments. The image is created when a temperature dependent substance material is present on the body panel and a heat source is applied to the opposite side of the panel with an intervening insulated area in a predetermined pattern.

11 Claims, 3 Drawing Sheets

ARRANGEMENT FOR TEMPORARILY DISPLAYING AN IMAGE ON A MOTOR VEHICLE PANEL

BACKGROUND OF THE INVENTION

1. Field of the Invention

The present invention generally relates to motor vehicles. More particularly, the present invention relates to an arrangement for temporarily displaying an image on a motor vehicle body panel.

2. Discussion

It is known in the prior art to put permanent images on body panels of automobiles. This is done with such regularity that nearly every automobile has at least the model of the vehicle emblazoned upon a body panel. Furthermore, images may be affixed so as to advertise the dealer of the automobile or to advertise the business of the owner of the automobile. For the most part, these images are permanently affixed to the exterior of the vehicle. They can not be removed without extensive labor and are not easily concealed.

It is also known to create relatively temporary designs and emblems upon certain surfaces. Generally, these inventions harness the thermo-chromatic abilities of certain substances that are painted or adhered to a surface. However, these inventions have been generally limited to toys, novelty items and the like. Furthermore, these inventions require uniform temperature dispersion at a constant rate to be able to view the image or color change.

SUMMARY OF THE INVENTION

It is a general object of the present invention to provide an arrangement for temporarily displaying an image on a motor vehicle panel.

It is another object of the present invention to provide such an arrangement that is inexpensively produced and easy to install onto the body panel of a vehicle.

It is still another object of the present invention to provide a body panel that has an arrangement integral in the body panel formation.

In the preferred form, the present invention provides a body panel upon which a predetermined phantom image may be temporarily displayed. This image will appear under certain weather conditions and then vanish after a few moments. The image is created when a temperature dependent material is present on the body panel and a heat source is applied to the opposite side of the panel with an intervening insulation material in a predetermined pattern.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
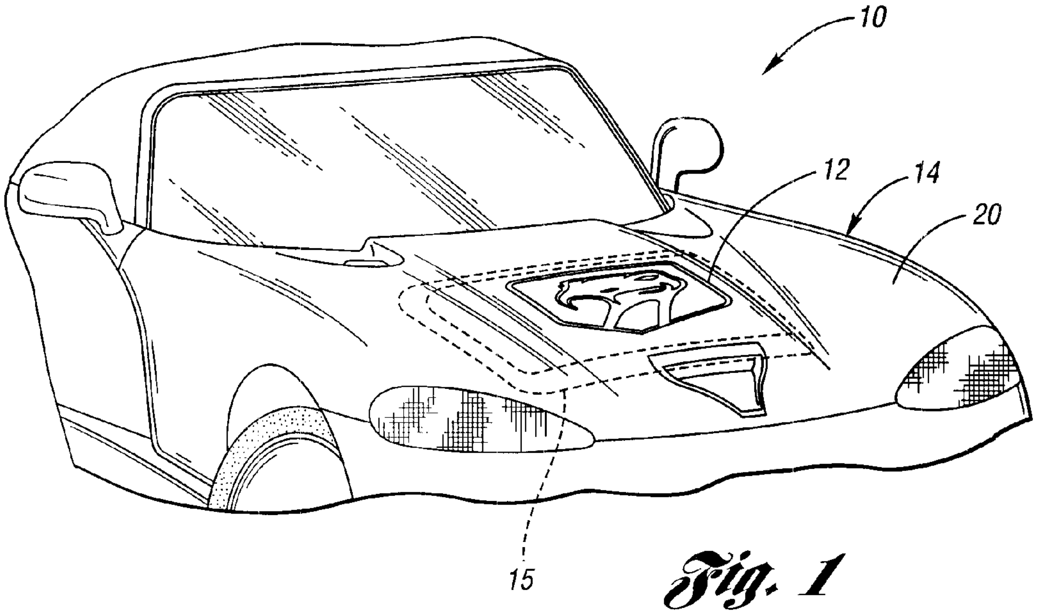
FIG. 1 is a perspective view of a portion of a motor vehicle including an arrangement for temporarily displaying an image on a motor vehicle panel in accordance with the teachings of a preferred embodiment of the present invention.
Figure 2:
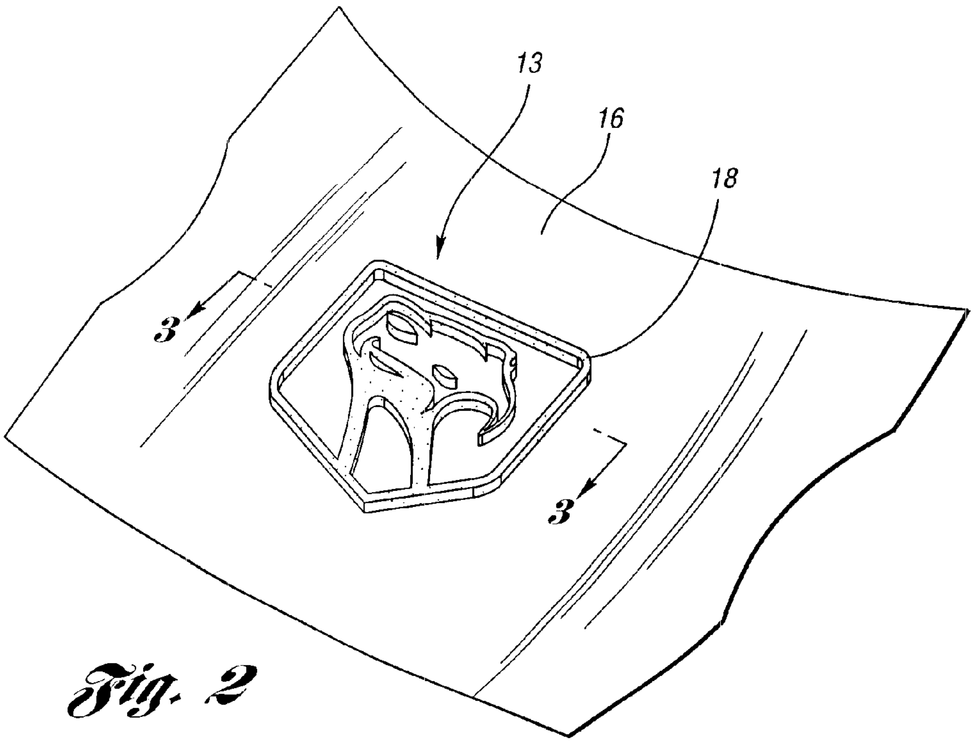
FIG. 2 is a view of the underside of the vehicle panel of FIG. 1.

With initial reference to FIGS. 1 and 2, an exemplary vehicle 10 is illustrated to include a temporary image 12. The temporary image 12 is produced with an arrangement 13 for temporarily displaying an image on a motor vehicle panel in accordance with the teachings of a preferred embodiment of the present invention. In the exemplary use shown, the image 12 is created on a top or exterior side 20 of a hood 14 of the vehicle 10. However, it will be understood that the teachings of the present invention are applicable for producing an image 12 on other body panels. Furthermore, in accordance with the present invention, the body panels upon which the image 12 is displayed may be made of a plurality of materials. Examples of materials from which the body panel may be produced include steel or one made of a composite material, such as carbon fiber.

The image 12 created by the arrangement 13 of the present invention is only temporary. As will become more apparent below, the image 12 is created when the hood 14 of the vehicle 10 is covered with a weather related, temperature dependent substance such as frost, dew or light snow. When an engine 15 in the vehicle 10 heats up, the temperature dependent substance evaporates in a predetermined manner.

Figure 2A:
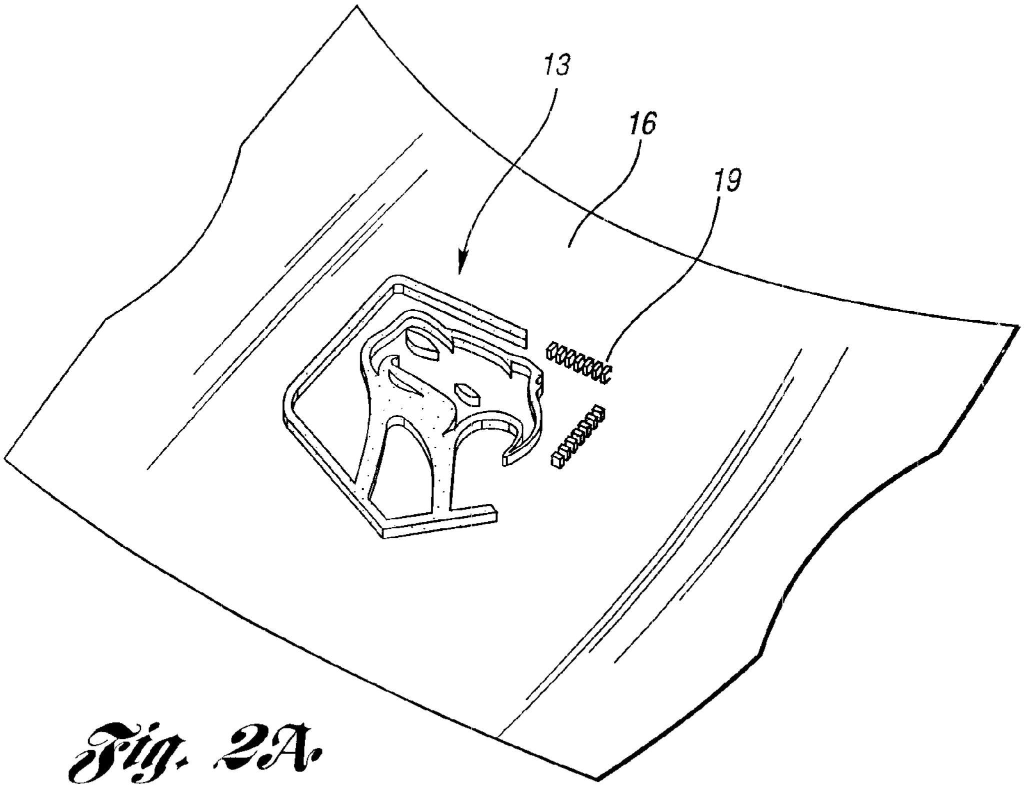
FIG. 2A is a view similar to FIG. 2 illustrating the arrangement modified to include a plurality of ribs.
Figure 3:
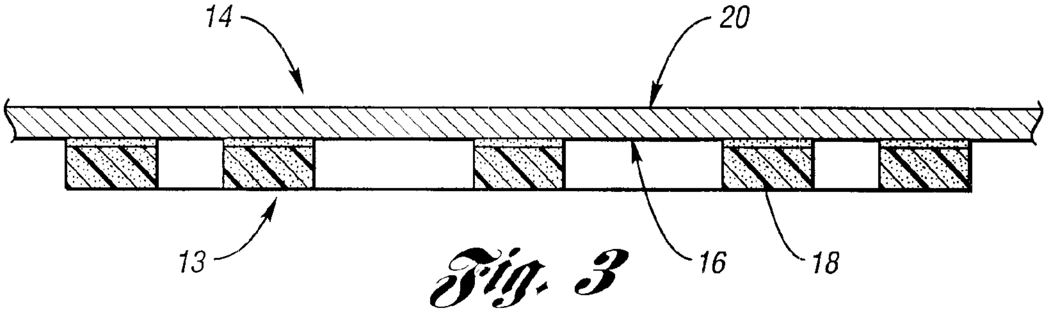
FIG. 3 is a cross-sectional view taken along the line 3—3 of FIG. 2.

With continued reference to FIGS. 1 and 2 and additional reference to FIGS. 2A and 3, the arrangement 13 of the present invention will be further described. The arrangement 13 is illustrated to include an insulation material 18 configured in a predetermined pattern. As illustrated, the predetermined pattern is designed to create an image 12 consistent with a trademarked Dodge Viper logo owned by the assignee of the subject application.

The insulation material 18 may be disposed between inner and outer hood panels or placed on a naked underside 16 of the hood 14 as shown in FIG. 2. Furthermore, the insulation material 18 may be made of a solid insulation affixed closely to the underside 16 of the hood 14. In another embodiment, the insulation material 18 may be hollow, thus effectively creating an air gap between the engine and the underside 16 of the hood 14. Also, certain structures such as ribs 19 (shown particularly in FIG. 2A) may be used to create an area of cooler air, relative to the remainder of the underside 16 of the hood 14.

As the vehicle's engine 15 warms during operation, the underside 16 of the hood 14 is heated as well. In turn, heat is transferred to the top side 20 of the hood 14. The insulation material 18 slows the transfer of heat to the top side 20 of the hood 14 in the areas covered by the insulation material 18. In this manner, a predetermined portion of the top side 20 of the hood 14 remains cooler for a period beyond that which the remainder of the top side 20 of the hood 14 remains cool. Explaining further, the area of the image 12, which is directly opposite the insulation material 18, is kept cooler due to the presence of the insulation material 18. Therefore, if there is a temperature dependent substance, such as frost, on the top side 20 of the hood 14 it would remain in the area opposite that of the insulation material 18 for a period greater than it would remain on the other portions of the top side 20 of the hood 14.

Figure 4:
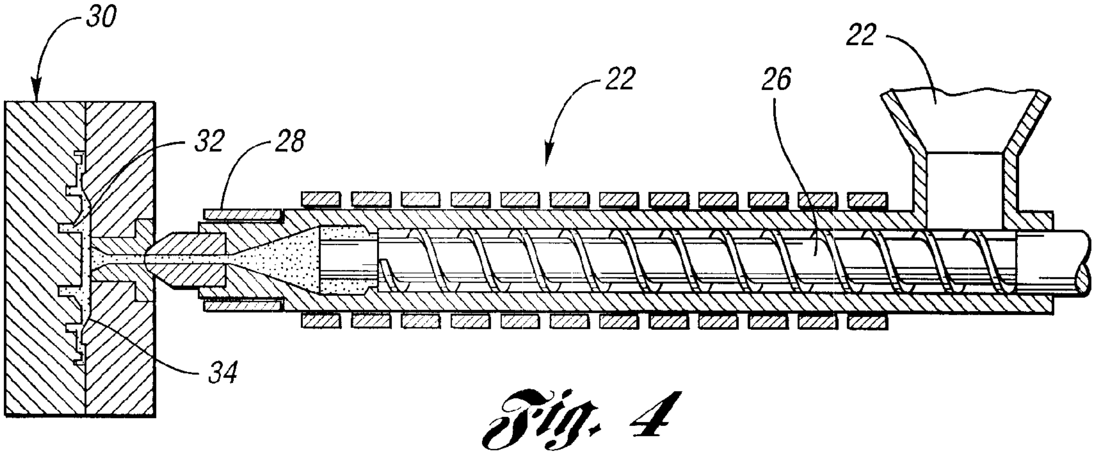
FIG. 4 is a cross-sectional view of an injection molding apparatus and mold.
Figure 5:
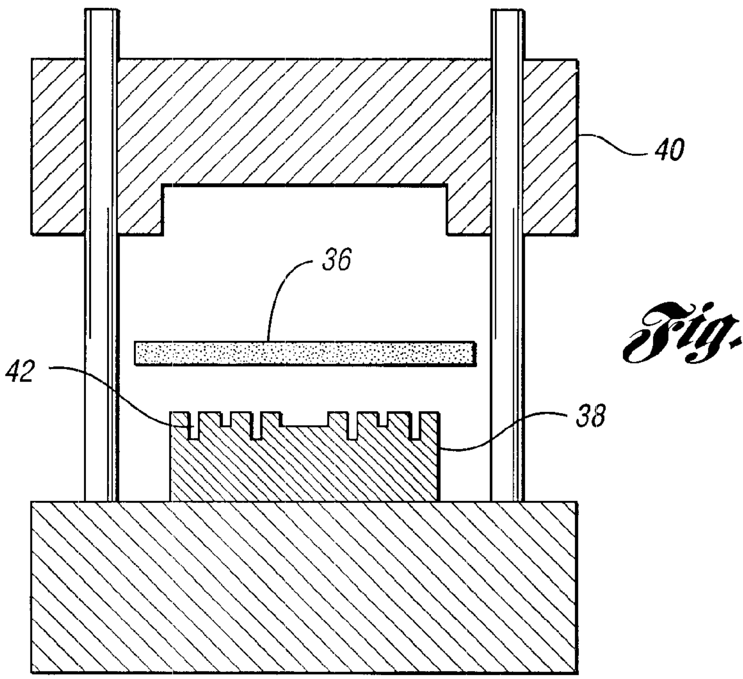
FIG. 5 is a cross-sectional view of a sheet molding compound apparatus.

The present invention may be further practiced in several different processes. With reference to FIGS. 4 and 5, an injection molding process and Sheet Molding Compound (SMC) are two further possibilities. With particular reference to FIG. 4, an exemplary injection molding apparatus 22 is shown. Plastic pellets (not shown) are mixed and fed through a feeder hopper 24 then further through a tube 26 which heats and melts the pellets into a liquid which is moved towards a nozzle 28. At the nozzle 28, the pellets are injected into a mold 30.

Various methods of injection molding are well known in the art. Typically, existing technology utilizes mold which is generally of constant thickness and has a varying shape depending on the particular product. However, in accordance with the present invention, the mold 30 may include varying thicknesses 32 on one side while being substantially flat on another 34.

Turning particular reference to FIG. 5, a second well known method of creating a molded composite panel is shown. Sheet Molding Compound (SMC) is well known in the art. It is known in the art to place a portion of SMC material 36 onto a mold or die 38, seal the die 38 with a top portion 40 and then heat the device to cause the SMC 36 to flow into the die 38 to create a finished product. However, generally the die 38 includes several surface variations for individual parts that are to be produced in the finished piece. In accordance with the present invention, the die 38 has varying thicknesses areas 42 while the top portion 40 is substantially flat thus creating a molded panel substantially flat on a first side with varying thicknesses on a second side.

Figure 6:
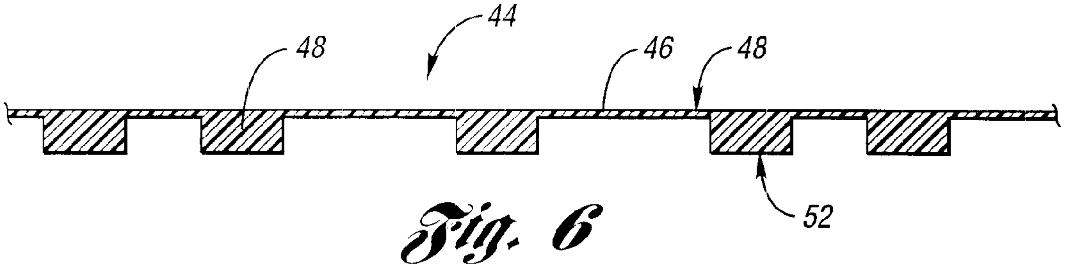
FIG. 6 is a cross-sectional view of a molded composite panel according to the present invention.

With reference to FIG. 6, an exemplary molded panel 44 produced by either injection molding (FIG. 4) or SMC (FIG. 5) is shown. The molded panel 44 includes areas that are both relatively thin 46 and relatively thick 48. The thick areas 48 are formed into the mold or die 30, 38 (from FIGS. 4 and 5) to produce a molded panel 44 that will produce the predetermined arrangement 13 (as shown in FIG. 1). In this way, it is the thicker areas 48 that produce slower warming of the top surface 50 of the molded panel 44 when a heat source is applied to the bottom surface 52.

Figure 7:
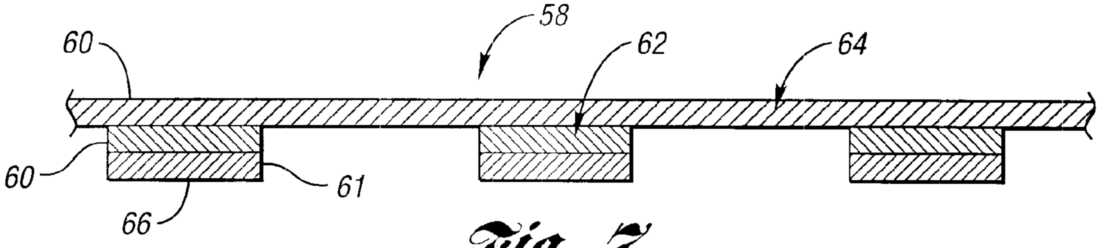
FIG. 7 is a cross-sectional view of a tailored blank according to the teachings of the present invention.

Another well known method in the art is that of tailored blanks where different layers of metal are laser welded together, generally for strength purposes. However, this process may now be used to create a flat panel that has varying layers of metal in a predetermined form to practice the present invention. Again creating a temperature variance between the first side and the second side of the panel when a heat source is applied to a first side of the panel. With particular reference to FIG. 7, a tailored blank panel 58 includes a top layer 60 of metal, which is continuous, with several auxiliary layers 61 welded to the top layer 60 to create a tailored blank panel 58. Similar to the molded panel 44 (FIG. 6), the tailored blank panel 58 has thicker areas 62 where auxiliary layers 61 are placed and thinner areas 64. The thicker areas 62 include several auxiliary layers 61 to create the predetermined formation. Therefore, as a heat source is applied to a first side 66 of the tailored blank panel 58, a temperature variance is created as the heat must travel through the auxiliary layers 61 in the thicker areas 62 and only the top layer 60 in the thinner areas 64.

Figure 8:
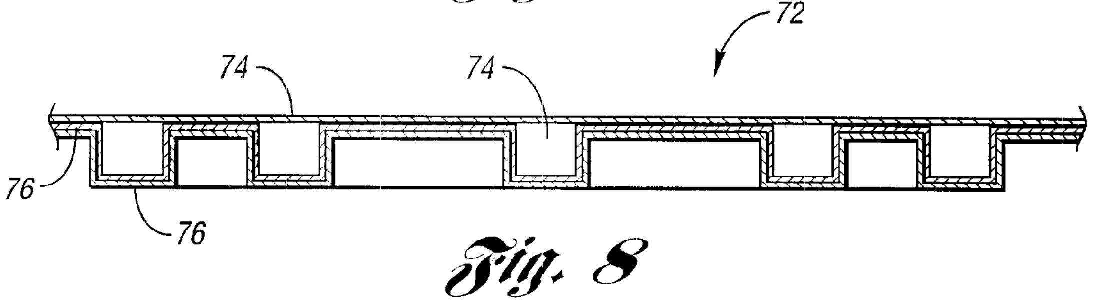
FIG. 8 is a cross-sectional view of a panel including air pockets according to the teachings of the present invention.

With reference to FIG. 8, yet another exemplary method includes creating air pockets 70 in a panel 72. An outer layer 74 of the panel 72 is substantially flat. Affixed to the outer layer 74 are interior layers 76 which cooperate with the outer layer 74 to create air pockets 70 therebetween. These air pockets 70 heat slower than the bare metal layers 76 and are positioned to create the desired predetermined pattern 13 (FIG. 1).

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A combination comprising:

a body panel having a first side and a second side, the second side defining an exterior portion of the vehicle;

an insulated area integral with the body panel arranged in a specified predetermined pattern;

a heat source positioned adjacent to the insulated area; and a temporary image formed by a temperature dependent substance disposed upon the second side, the image having the predetermined pattern being formed on the insulated area of the second side upon evaporation of the temperature dependent substance from non-insulated areas of the second side, the temperature dependent substance being at least one of frost, snow, and dew.

2. The combination of claim 1, wherein the body panel is constructed of a metal.

3. The combination of claim 1, wherein the body panel is constructed of a composite material.

4. The combination of claim 1, wherein the insulated area has a heat capacity greater than that of the panel.

5. The combination of claim 1, wherein the body panel is a hood.

6. The combination of claim 1, wherein the heat source is an engine.

7. The combination of claim 1, wherein the predetermined pattern of the insulated area is a varied thickness of the body panel.

8. The combination of claim 7, wherein the varied thickness of the body panel is formed through varying a mold thickness.

9. The combination of claim 7, wherein the varied thickness of the body panel is formed through adhering several layers formed in the predetermined pattern.

10. A method of creating a temporary image on a vehicle panel having a temperature dependent substance on an exterior side, the temperature dependent substance being at least one of frost, snow, and dew, the method comprising the steps of:

configuring an insulated area in a specified predetermined pattern;

forming the insulated area integral with an interior side of the vehicle panel;

warming the vehicle panel from adjacent the interior side; and forming a temporary image configured substantially in the predetermined pattern in the temperature dependent substance on the insulated area of the exterior side of the panel upon evaporation of the temperature dependent substance from non-insulated areas of the exterior side of the panel.

11. The method of claim 10, wherein the vehicle panel is a hood.

* * * * *